United States Patent Office 3,253,003
Patented May 24, 1966

3,253,003
Δ$^{4,6}$-PREGNADIENES
Albert Wettstein, Riehen, and Georg Anner and Jaroslav Kalvoda, Basel, Switzerland, assignors to Ciba Corporation, New York, N.Y., a corporation of Delaware
No Drawing. Filed Mar. 25, 1964, Ser. No. 354,771
Claims priority, application Switzerland, Apr. 10, 1963, 4,659/63
2 Claims. (Cl. 260—397.4)

The present invention relates to the manufacture of new steroids of the general formula (1)
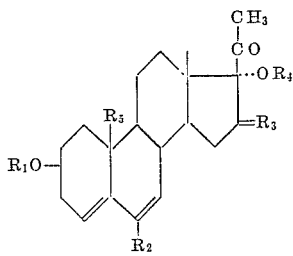

where $R_1$ stands for a hydrogen atom or an acyl radical or a hydrocarbon radical or the tetrahydropyranyl radical, $R_2$ for a hydrogen or halogen atom or a lower alkyl group, $R_3$ for two hydrogen atoms, or a methylene group, or a hydrogen atom together with an α- or β-positioned hydroxyl, lower alkoxy, acyloxy or lower alkyl group, $R_4$ for an acyl radical and $R_5$ for a hydrogen atom or a methyl group.

The acyl radical is more especially that of an aliphatic, cycloaliphatic, aromatic or araliphatic carboxylic acid with 1 to 15 carbon atoms, for example the acyl radical of formic, acetic, propionic acid, of the butyric acids, valeric acids, such as n-valeric acid or trimethylacetic acid, of the caproic acid such as β-trimethyl-propionic acid or diethylacetic acid, of oenanthic, caprylic, pelargonic, capric, undecylic acids, for example of undecylenic acid, of the lauric and myristic acids, of the cyclopropyl-, cyclobutyl-, cyclopentyl- and cyclohexylcarboxylic acids, cyclopropylmethylcarboxylic acid, cyclobutylmethylcarboxylic acid, cyclopentylethylcarboxylic acid, cyclohexylethylcarboxylic acid, of the cyclopentyl-, cyclohexyl-, or phenyl-acetic acids or -propionic acids, of benzoic acid, phenoxyalkane acids such as phenoxyacetic acid, para-chlorophenoxy-acetic acid, 2:4-dichlorophenoxyacetic acid, 4-tertiary butylphenoxyacetic acid, 3-phenoxypropionic acid, 4-phenoxybutyric acid, of furan-2-carboxylic acid, 5-tertiary butyl-furan-2-carboxylic acid, 5-bromofuran-2-carboxylic acid, of nicotinic acid, of β-ketocarboxylic acids, for example of acetoacetic, propionylacetic, butyrylacetic or caprinoyl-acetic acid, of amino acids such as diethylaminoacetic acid, aspartic acid and the like. Instead of radicals of carboxylic acids there may be present those of sulfonic acids, phosphoric, sulfuric or hydrohalic acids.

Special importance attaches to acids that contain a group imparting solubility in water, such as a hydroxyl, carboxyl or amino group, since the semiesters of these acids may be used for the preparation of aqueous solutions. They are derived from dicarboxylic acids, for example from oxalic, succinic, maleic, glutaric, dimethylglutaric, pimelic, acetonedicarboxylic, acetylenedicarboxylic, phthalic, tetrahydrophthalic, hexahydrophthalic, endomethylene-tetrahydrophthalic, endomethylene-hexahydrophthalic, endoxy-hexahydrophthalic, endoxy-tetrahydrophthalic, camphoric, cyclopropanedicarboxylic, cyclobutanedicarboxylic, diglycolic, ethylenebisglycolic, polyethylenebisglycolic, thioglycolic, furan-dihydrofuran-, tetrahydrofuran-dicarboxylic acids, quinolinic, cinchomeronic acid, as well as from the polyethylene-glycol monoalkyl ether semiesters of the afore-mentioned dicarboxylic-acids, or from polybasic inorganic acids, such as sulfuric acid, phosphoric acids and the like.

In these semiesters the free acid group of the dicarboxylic acids or of the polybasic inorganic acids can also be further esterified. Thus, for example, by reaction with diazomethane in methanol-ether the methyl esters of the 3-hemidiglycolates, 3-hemisuccinates etc. are obtained.

A hydrocarbon radical is more especially a lower alkyl, cycloalkyl or aralkyl radical, such as the methyl, ethyl, propyl, isopropyl, butyl, isobutyl, tertiary butyl, cyclopentyl, cyclohexyl or benzyl group.

Notwithstanding the fact that the new compounds contain no oxo group or an enolester function in position 3 of the steroid skeleton they display a strong gestagenic action. Compared with the known 3-oxo analogues (some of which are very sparingly soluble) they offer the advantage of better resorptivity and solubility. Thus, for example, the compounds of the Formula 1 in which $R_1$ stands for a hydrogen atom are surprisingly more readily soluble the conventional liquid medicinal excipients than the corresponding 3-oxo compounds. When $R_1$ represents an acyl or hydrocarbon radical the solubility in oil or in water of these products can be further increased depending on the hydrophilia of these radicals. However, as the radical $R_1$ is lengthened or increased in size, the duration of activity is augmented accordingly. The new products may also be used as starting materials for the manufacture of other pharmacologically valuable compounds.

Special mention on account of their good activity deserve those compounds of the Formula 1 in which $R_2$ and $R_3$ each stands for hydrogen atoms and the other substituents are as defined above. The corresponding 19-nor compounds display an outstanding activity. As specific compounds there should be mentioned Δ$^{4,6}$-3β-hydroxy-17α-acetoxy-20-oxo-pregnadiene, Δ$^{4,6}$-3β-hydroxy-17α-propionyloxy-20-oxo-pregnadiene, Δ$^{4,6}$-3β-hydroxy-17α-valeryloxy-20-oxo-pregnadiene, Δ$^{4,6}$-3β-hydroxy-17α-caproyloxy-20-oxo-pregnadiene, Δ$^{4,6}$-3β-hydroxy-17α-enanthoyloxy-20-oxo-pregnadiene, the corresponding 3-esters and especially the acetates, propionates, phenylpropionates, trimethylacetates, valerates, butyrates, enanthates, undecylenates, decanoates, caproates, the 6-chloro- and 6-fluoro-derivatives thereof and the 19-nor-derivatives of all these compounds.

The new compounds can be prepared by known methods. Inter alia, for example, a compound of the formula (2)
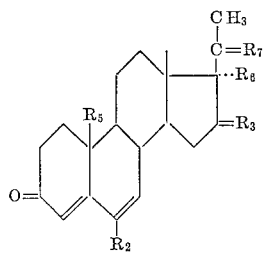

where $R_2$, $R_3$ and $R_5$ have the above meanings, $R_6$ stands for a free, esterified or etherified hydroxyl group,

represents a free or protected carbonyl or carbinol group, is reduced with a complex light-metal hydride, then, in any order of succession a free hydroxyl group or a protected hydroxyl or oxo group in 20-position is converted into a free oxo group and any free or etherified hydroxyl group in 17α-position is converted into an etherified hydroxyl group, while, if desired, the 3-hydroxy group formed is esterified, and, if desired, any 3-acyloxy group is hydrolysed or any 3-hydroxy group is esterified or etherified.

As complex light-metal hydrides there are suitable, for example, alkali metal-aluminum hydrides, such as lithium, sodium or potassium aluminum hydride, and from among mildly acting compounds the alkali metal or alkaline earth metal borohydrides or lithium trialkoxy-aluminum hydrides, for example lithium, sodium or potassium borohydride, lithium trimethoxy, triethoxy or tri-tertiary butoxy-aluminum hydride or calcium borohydride.

Compounds of the Formula 1, where $R_1$ represents hydrogen and $R_2$ to $R_5$ have the above meanings, are unexpectedly obtained in an excellent yield by reducing a corresponding 3-oxo compound with a mildly acting complex light-metal hydride. Thus, this reduction takes a selective course, without affecting the 20-oxo group.

The boronhydrides are advantageously reacted with the 3-oxosteroids in lower alkanols such as methanol, ethanol, propanol or butanol, and the aluminum hydrides, on the other hand, in an ether such as diethyl ether, tetrahydrofuran or dioxane. Further suitable solvents are hydrocarbons, more especially aromatic hydrocarbons, such as benzene, toluene or xylene.

In the compounds of the above Formula 2 which are used as starting compounds, when

represents a free or protected carbonyl group, $R_7$ may be for instance a free oxo group or a ketalized oxo group, for instance an ethylenedioxy group. On the other hand when

represents a protected carbinol group, $R_7$ represents for instance an esterified or an etherified hydroxyl group and $R_7$ and $R_6$ taken together may in such a case represent an alkylidenedioxy group.

The conversion of a free hydroxyl or a protected hydroxyl or oxo group in 20-position into an oxo group can be effected in a manner knwn per se in the art. Thus, for instance, a 20-ketal group may be hydrolysed by the aid of an acidic agent, if desired, after the free 3-hydroxyl group formed has been esterified. In 3, 17, 20-trihydroxy-compounds obtained in the reduction step of the process, the conversion of the 20-hydroxyl group into the oxo group may be effected in the following manner: the 3-hydroxyl group is selectively esterified, if desired, after the 17,20-dioxy grouping has been protected by conversion into an alkylidene derivative, which latter is then removed by acid hydrolysis, and the so obtained 3-acyloxy-17, 20-dihydroxy-steroids are oxidized to 3-acyloxy-17-hydroxy-20-ketones.

The esterification according to the invention of a resulting 3-hydroxy compound or a 3,17-dihydroxy compound can be performed, for example, with the aforesaid acids or their functional derivatives, such as halides or anhydrides, advantageously in the presence of a base, such as pyridine. The selective esterification of the 3-hydroxyl group is preferably performed with the free acids, for example acetic acid. In the so obtained 3-acyloxy-17-hydroxy compounds the 17-hydroxyl group can then be esterified e.g. with an acid different from that of the 3-ester group.

The 17:20-alkylidene dioxy compounds are obtained, for example, by reacting the 17:20-dihydroxysteroid formed with an alkanone, such as acetone or methylethyl ketone, in the presence of a catalyst, such as anhydrous copper sulfate or para-toluenesulfonic acid.

The hydrolysis of the 20-ketals or the 17α:20-alkylidene dioxy compounds is preferably performed with an aqueous acid, for example dilute acetic, hydrochloric or sulfuric acid. 20-ketals can be converted into 20-ketosteroids by reaction with an alkanone in the presence of an acidic catalyst.

The oxidation of a resulting 20-hydroxysteroid is carried out under mild conditions, for example with a compound of hexavalent chromium, such as pyridinium chromate, advantageously at a low temperature.

The 3-acyloxy compounds formed by the present process hydrolyse even under very mild conditions, for example on being heated in water. Alternatively, the hydrolysis may be performed with a basic agent, such as an alkali metal bicarbonate, carbonate, hydroxide or alcoholate.

The etherification of the 3-hydroxy group is achieved, for example, by treatment with a reactive, esterified alkanol, cycloalkanol or aralkanol, such as the hydrohalic or sulfonic acid esters thereof, in the presence of a base, for example one of those mentioned above, or with dihydropyran in the presence of an acid.

The reactions according to the present invention are performed in the usual manner, in the presence or absence of a catalyst or condensing agent, at room temperature or with cooling or heating, if desired under superatmospheric pressure and/or under an inert gas. The reaction of the 3:20-diketosteroids with mildly acting light-metal hydrides is advantageously performed at a temperature ranging from −20° C. to the boiling point of the solvent used.

The invention also includes any modification of the present process in which an intermediate obtained at any stage of the process is used as starting material and any remaining step/steps is/are carried out or the process is discontinued at any stage thereof, or in which a starting material is formed under the reaction conditions or is used in the form of a derivative thereof.

Preferred use is made in the process of those starting materials which give rise to the final products specifically mentioned above.

The starting materials are known or, insofar as they are new, they can be prepared by known methods. The 3-ketones corresponding to the Formula 1 may be prepared, for example, by dehydrogenation, for instance with chloranil, or by bromination and dehydrobromination of the corresponding known $\Delta^4$-3:20-dioxo-17α-acyloxypregnenes. The manufacture of starting materials of 19-nor-pregnane series and of 6-halogen compounds has been described, for example, in Indian patent application No. 80,715 and British Patent No. 940,113.

Starting materials that contain the 20-ketal or 17:20-alkylidenedioxy grouping can be prepared, for example, from corresponding $\Delta^5$-3:17α-dihydroxy-20-oxosteroids by reaction with glycols or from $\Delta^5$-3:17α:20-trihydroxy-steroids by reaction with alkanones in the presence of an acidic catalyst, respectively, oxidation of the 3-hydroxyl group (for example by the Oppenauer method) and introduction of the double bond in position 6:7, for example by means of chloranil.

The new compounds are suitable for use in medicine as medicaments, for example in the form of pharmaceutical preparations which contain the new compounds in conjunction or admixture with organic or inorganic, solid or liquid pharmaceutical excipients suitable for enteral (for example oral) or parenteral administration. Suitable excipients are substances that do not react with the new compounds, for example water, gelatine, lactose, starches, magnesium sterate, talcum, vegetable oils, benzyl alcohols, gums, polyalkylene glycols, white petroleum jelly, cholesterol or other known medicinal excipient. The pharmaceutical preparations may be in solid form, for example tablets, dragees or capsules, or in liquid or semi-liquid form e.g. solutions, suspensions, emulsions, ointments or creams. These pharmaceutical preparations may be sterilized and/or may contain assistants such as preserving, stabilizing, wetting or emulsifying agents, salts for regulating the osmotic pressure or buffers. They may also contain further therapeutically valuable substances; they are formulated in the known manner. The content of the active substance in these preparations per unit dose such as of a tablet, is preferably, 0.1–50 mg. or 0.03–60%. The following examples illustrate the invention.

Example 1

A solution of 2.0 g. of $\Delta^{4:6}$-3:20-dioxo-17$\alpha$-acetoxy-19-norpregnadiene in 240 ml. of methanol is mixed with 300 mg. of sodium borohydride and stirred for 2 hours at 20° C.; 0.6 ml. of glacial acetic acid is then added and the reaction mixture is extensively concentrated in a water-jet vacuum. 200 ml. of water are added to the residue, the suspension so formed is extracted with methylene chloride, the organic layer is washed with water, dried and evaporated in a water-jet vacuum. Yield: 2.05 g. of crude, crystalline $\Delta^{4:6}$-3$\beta$-hydroxy-17$\alpha$-acetoxy-20-oxo-19-norpregnadiene which, on recrystallization from methylene chloride+ether or acetone+ether, yields 1.5 g. of the pure compound melting at 188–190° C. Optical rotation $[\alpha]_D^{25}=-76°$ C. (c.=0.613).

When 1.0 g. of $\Delta^{4:6}$-3:20-dioxo-6-chloro-17$\alpha$-acetoxy-19-norpregnadiene (melting at 159–160° C.) is reacted under identical conditions, it yields 1.0 g. of crude $\Delta^{4:6}$-3$\beta$-hydroxy-6-chloro-17$\alpha$-acetoxy-20-oxo-19-norpregnadiene.

Reduction in identical manner of 600 mg. of pure $\Delta^{4:6}$-3:20-dioxo-17$\alpha$-caproyloxy-19-norpregnadiene (melting at 124° C.) gives a 85% yield of pure $\Delta^{4:6}$-3$\beta$-hydroxy-17$\alpha$-caproyloxy-20-oxo-19-norpregnadiene. Ultraviolet maximum at 239 m$\mu$ ($\epsilon$=26,200).

In all cases the mother liquors also contain small amounts of the corresponding 3$\alpha$-hydroxy compounds.

Example 2

A solution of 1.0 g. of $\Delta^{4:6}$-3:20-dioxo-17$\alpha$-acetoxypregnadiene (melting at 219° C.) in 30 ml. of tetrahydrofuran is slowly dropped with cooling into a solution of lithium tri-tertiary butoxy aluminum hydride (prepared by reacting 450 mg. of lithium-aluminum hydride in 30 ml. of tetrahydrofuran with a mixture of 3.5 ml. of absolute tertiary butanol and 10 ml. of tetrahydrofuran at −4 to −6° C.). The reaction mixture is then stirred for 15 minutes at 0° C., cooled to about −10° C., mixed dropwise with a mixture of 95 ml. of acetone and 5 ml. of tetrahydrofuran and then with a solution of 1 ml. of water in 10 ml. of tetrahydrofuran; the batch is stirred for another 10 minutes at about 5° C., 10 g. of sodium sulfate are added, and the insoluble inorganic share is then filtered off. The filtrate is evaporated in a water-jet vacuum; the residue is dissolved in methylene chloride and the solution is filtered through paper. Renewed crystallization yields 977 mg. of crude, crystalline $\Delta^{4:6}$-3$\beta$-hydroxy-17$\alpha$-acetoxy-20-oxopregnadiene which after one recrystallization from methylene chloride+ether furnishes 765 mg. of the pure product melting at 188–190° C.; its infrared spectrum contains, inter alia, bands at 2.80, 5.76, 5.81, 8.10, 9.02, 9.27, 9.53, 9.81 and 11.56$\mu$.

Example 3

700 mg. of $\Delta^{4:6}$-3$\beta$-hydroxy-17$\alpha$-acetoxy-20-oxo-19-norpregnadiene are dissolved in a mixture of 3.5 ml. of pyridine and 3.5 ml. of acetic anhydride, and the solution is kept for 18 hours at 20° C. The reaction mixture is poured into ice water, stirred for 15 minutes, and the precipitated product is filtered off, rinsed with water and taken up in a 1:5-mixture of methylene chloride and ether; the solution is washed with dilute sulfuric acid, saturated sodium bicarbonate solution and with water until the washings run neutral, dried and evaporated in a water-jet vacuum. On recrystallization from methylene chloride+ether +petroleum ether or from methylene chloride+methanol, the resulting crude product (700 mg.) yields 580 mg. of pure $\Delta^{4:6}$ - 3$\beta$:17$a$ - diacetoxy-20-oxo-19-norpregnadiene melting at 203 to 205° C.; its infrared spectrum contains, inter alia, bands at 5.78, 8.10, 8.96, 9.26, 9.55 and 9.80$\mu$.

Example 4

A solution of 800 mg. of $\Delta^{4:6}$-3$\beta$-hydroxy-17$\alpha$-acetoxy-20-oxopregnadiene in 4.0 ml. of pyridine is mixed with 4.0 ml. of acetic anhydride and kept overnight at room temperature. Processing is carried out as described in Example 3. Yield: 860 mg. of a crude product which on recrystallization from methylene chloride+ether furnishes 750 mg. of $\Delta^{4:6}$-3$\beta$:17$\alpha$-diacetoxy-20-oxo pregnadiene. The compound melts at 183–185° C.; its ultraviolet spectrum displays a maximum at 240 m$\mu$ ($\epsilon$=27.400).

An analogous reaction of 1.0 g. of the identical starting material with 4.0 ml. of caproic anhydride and 4.0 ml. of pyridine gives a yield of 83–85% of the corresponding 3$\beta$-caproyl derivative.

The method described in Example 1 can also be used for reducing $\Delta^{4:6}$-3:20-dioxo-17$\alpha$-valeryloxy-19-norpregnadiene (melting at 164° C.) to $\Delta^{4:6}$-3$\beta$-hydroxy-17$\alpha$-valeryloxy-20-oxo-19-norpregnadiene (yield: 80 to 86%).

Example 5

The following pharmaceutical preparations are made in a manner known per se:

1000 tablets for oral administration containing 1 mg. of $\Delta^{4:6}$-3$\beta$-hydroxy-17$\alpha$-acetoxy-20-oxo-19-nor-pregnadiene.

| Ingredients: | G. |
|---|---|
| $\Delta^{4:6}$-3$\beta$-hydroxy-17$\alpha$-acetoxy-20-oxo-19-nor-pregnadiene | 1.00 |
| Lactose | 53.00 |
| Gelatine | 1.00 |
| Wheat starch | 39.50 |
| Magnesium stearate | 0.30 |
| Talc | 5.20 |
| | 100.00 |

*Procedure.*—The mixture of the active ingredients, lactose and wheat starch is moistened with a gelatine solution of 10% strength to form a slightly plastic mass and then granulated in the usual manner, after being dried at 40° C., the mass is brought into the usual grain size by being passed through a sieve. Magnesium stearate and talc are added to the dried mass and the mixture is then compressed into tablets of 7 mm. in diameter.

1000 tablets for oral administration containing 5 mg. of $\Delta^{4:6}$-3$\beta$-hydroxy-17$\alpha$-acetoxy-20-oxo-pregnadiene.

| Ingredients: | G. |
|---|---|
| $\Delta^{4:6}$-3$\beta$-hydroxy-17$\alpha$-acetoxy-20-oxo-pregnadiene | 5.00 |
| Lactose | 70.00 |
| Gelatine | 3.00 |
| Wheat starch | 40.00 |
| Arrowroot | 15.00 |
| Magnesium stearate | 0.7 |
| Talc | 6.3 |
| | 140.00 |

The procedure for making the preparation is analogous to that described above.

100 oil ampoules each containing 10 mg./ml. of $\Delta^{4:6}$-3$\beta$-hydroxy-17$\alpha$-caproyloxy-20-oxo-nor-pregnadiene.

Ingredients:
| | |
|---|---|
| $\Delta^{4:6}$-3$\beta$-hydroxy-17$\alpha$-caproyloxy-20-oxo-19-nor-pregnadiene __g__ | 1 |
| Benzyl alcohol __cc__ | 10 |
| Sesame oil __cc__ | 90 |

The active ingredient is dissolved in pure benzyl alcohol and the stirred solution diluted with hot sterilized sesame oil. 1 cc. of this solution containing the ingredients in the above given amounts is filled in ampoules which are sterilized at 160° C. for 1.5 hours.

What is claimed is:
1. A compound of the formula

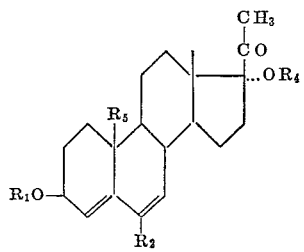

wherein $R_1$ is a member selected from the group consisting of hydrogen, acyl, lower alkyl, cyclopentyl, cyclohexyl, monocyclic-carbocyclic-aryl-lower alkyl and tetrahydropyranyl, $R_2$ is halogen, $R_4$ is acyl and $R_5$ is hydrogen, said acyl groups being derived from carboxylic acids selected from the group consisting of aliphatic, cycloaliphatic, aromatic, araliphatic and heterocyclic carboxylic acids having from 1 to 15 carbon atoms.

2. $\Delta^{4:6}$ - $3\beta$ - hydroxy-6-chloro-17α-acetoxy-20-oxo-19-nor-pregnadiene.

References Cited by the Examiner
UNITED STATES PATENTS
3,126,399  3/1964  Sollman _____ 260—397.4

OTHER REFERENCES
Baran: Jour. Med. Chem. 6, pages 329–30, May 1963.

LEWIS GOTTS, *Primary Examiner.*
HENRY A. FRENCH, *Assistant Examiner.*